United States Patent
Bryan

(10) Patent No.: US 7,342,852 B2
(45) Date of Patent: Mar. 11, 2008

(54) METHOD AND APPARATUS FOR DIFFERING FOCUS BETWEEN AT LEAST TWO DIMENSIONS

(75) Inventor: Robison J. Bryan, North Hills, CA (US)

(73) Assignee: Discovision Associates, Long Beach, CA (US)

( * ) Notice: Subject to any disclaimer, the term of this patent is extended or adjusted under 35 U.S.C. 154(b) by 317 days.

(21) Appl. No.: 10/906,364

(22) Filed: Feb. 16, 2005

(65) Prior Publication Data

US 2006/0181973 A1   Aug. 17, 2006

(51) Int. Cl.
*G11B 7/00* (2006.01)
(52) U.S. Cl. .............................. 369/44.25; 369/44.28; 369/44.23
(58) Field of Classification Search ............. 369/44.25, 369/44.28, 44.23, 53.19, 44.11, 44.32, 44.15, 369/44.29, 112.03, 112.05, 30.21, 30.22, 369/53.35
See application file for complete search history.

(56) References Cited

U.S. PATENT DOCUMENTS 6,567,354 B2 *   5/2003   Yanagawa ................ 369/44.23

* cited by examiner

*Primary Examiner*—Ali Neyzari
(74) *Attorney, Agent, or Firm*—Steve A. Wong

(57) ABSTRACT

The present invention obtains a more optimal focus in at least two dimensions (such as axial and radial dimensions) by setting or keeping a focus in at least a first dimension (such as both axial and radial dimensions) and detecting and adjusting the focus in a second dimension (such as radial dimension) so that it can be brought to the same focal plane as the focus for the at least first dimension (such as both axial and radial dimension). An actuator lens assembly is used to continually adjust the focus for either primarily the first dimension or primarily the second dimension, using a feedback loop. In one embodiment of the present invention, certain photocell(s), (such as photocells E and F that are normally used for tracking) are compared to certain photocell(s), (such as photocells A and B and C and D) in order to derive a Radial Focus Error (RFE) signal, by observing radial spot size.

25 Claims, 7 Drawing Sheets

METHOD AND APPARATUS FOR DIFFERING FOCUS BETWEEN AT LEAST TWO DIMENSIONS

FIELD OF THE INVENTION

The present invention relates to the focusing of optical media players, and in particular to differing the focus of an optical media player between dimensions.

BACKGROUND OF THE INVENTION

Optical media players and recorders, such as current compact disc (CD) and digital video disc (DVD) systems operate generally by directing an optical beam from a source, causing the beam to contact a specific location on an optical medium where data is stored, and receiving the data via the reflection of the beam back to receiving devices. To make this happen, current systems are required, at least, to perform two necessary functions, which are tracking and focusing.

Current focusing involves fine-tuning the manner in which the optical beam impinges upon the optical medium. Current tracking involves placing the beam (and consequently the source of the beam) in a specific location so it will impinge upon the optical medium in the appropriate place. Thus, in a current optical media player and/or recorder, the optical media typically is rotated and an optical beam is continually both focused onto the media and moved (using tracking functionality) to the appropriate place on the media, so that the data can be reflected back to a receiving device and output, for instance to a speaker and/or a television.

Therefore, a current optical media player operates generally as shown in FIG. 1 in order to allow a user to listen to a song, watch a movie or otherwise interact with data upon the medium. The player holds an optical medium 110, such as a CD or DVD. The medium 110 is caused to spin, and a light source 120 directs an optical beam 130 to the medium 110. The beam 130 then reflects back to a receiving device 140, via a reflector 115, where a focusing function 150 and a tracking function 160 work in tandem to make beam 130 both in the right place and converged to a point at the correct depth. As time passes (through a combination of spinning the medium 110 and the tracking function 160), the beam 130 may be directed across the entire spiral track 170 so that the entire CD or DVD can be accessed. Similarly, the beam 130 can be moved between tracks, for instance track A 180 and track B 190, when the user jumps between scenes and/or songs.

FIG. 2 provides an example of current focusing, which includes a more detailed analysis of focusing function 150 of FIG. 1. Focus is detected by focusing function 200, which comprises photocells A, B, C, and D in a conventional three beam tracking configuration where photocells A+C are compared to photocells B+D to obtain a focus error signal (FE) 210 from the reflection of beam 240 from medium 260 via reflector 265. FE is used in a feedback loop to connect to a beam source 220, typically an optical head, which is adjusted based on the results of A+C compared to B+D. Therefore the readings at A, B, C, and D are continually used to adjust the beam source 220 to maintain continual focus.

Currently any phenomenon that caused focus to differ between axial and radial dimensions would force a compromise between two optimum focal planes in the focusing function 200, one for each of the two dimensions. This results in a spot 250 on the medium 260 that is not as small and bright as would be possible if focusing function 200 was performed in a manner that more closely resembled a theoretically optimal focus.

Moreover, when using modern optical devices, such as those described with respect to a co-pending patent application entitled "Low Seek Time Optical Disc Tracking System", filed on Dec. 22, 2004, and having application Ser. No. 10/905,231, (the disclosure of which is herein incorporated by reference) there is an improvement to the invention when each dimension of focus is independently adjustable, (even if resolved by interdependent means).

SUMMARY OF THE INVENTION

The present invention obtains a more optimal focus in at least two dimensions (such as axial and radial dimensions) by setting or keeping a focus in at least a first dimension (such as both axial and radial dimensions) and detecting and adjusting the focus in a second dimension (such as radial dimension) so that it can be brought to the same focal plane as the focus for the at least first dimension (such as both axial and radial dimension). The terms radial dimension and axial dimension are used herein to refer to two dimensions that may or may not pertain to a disc shaped media. Therefore, the at least two dimension names may or may not be arbitrary rather than descriptive. Furthermore, references to two dimensions should be understood to pertain to a certain two dimensions of a tracking and focus system of at least two dimensions rather than only two dimensions.

An actuator lens assembly is used to continually adjust the focus in the radial dimension using a feedback loop. In one embodiment of the present invention, certain photocell(s), such as photocells E and F (normally used for tracking) are compared to certain photocell(s), such as photocells A and B and C and D, in order to derive a Radial Focus Error (RFE) signal, by observing radial spot size.

In the operation of one embodiment of the present invention, focus is adjusted by focus drive (FD) actuators, which move an objective lens of an optical head in a third, "Z" dimension. An additional actuator driven lens called the radial focus lens (RFD lens) is added to the optical head assembly, wherein a beam from a light source proceeds on a path from the objective lens and then through the RFD lens. The RFD lens is more cylindrical in shape (or equivalent) so that the focus of beam is modified primarily in the radial direction, leaving the axial dimension of beam focus either less significantly modified or effectively unmodified as the beam passes through.

A feedback loop is used wherein the reflectivity of certain photocell(s), such as of E and F is considered in conjunction with the reflectivity of certain photocell(s), such as A, B, C, and D in order to detect and adjust the radial spot size. Having more optimally focused in the first dimension, in this case radial, the focus is finished by adjusting in a second (axial) dimension, where the spot size is adjusted in the conventional manner of averaging between the two optimal focal planes. When the measurements and or adjustments in the first and second dimensions are combined, a spot on a medium is improved in shape, quality, and precision by the essentially independent adjustment in each dimension of focus obtained through the resolution of related focus equations or functions thereof, solving for either of or each of the dimensions of focus, or a combination thereof.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF A PREFERRED EMBODIMENT

The present invention obtains a more optimal focus in both dimensions by detecting and adjusting the focus in the radial dimension so that it can be brought to the same focal plane as the focus for the axial dimension. An actuator lens assembly is used to continually adjust the focus in the radial dimension using a feedback loop. The term lens, as used herein, should be understood by one skilled in the art to represent an optical functionality comprising one or more optical elements (such as lenses or reflectors for instance), which is capable of adjusting focus.

A feedback loop is used wherein the reflectivity of certain photocell(s), such as of E and F is considered in conjunction with the reflectivity of certain photocell(s), such as A, B, C, and D in order to detect and adjust the radial spot size. Having more optimally focused in the first dimension, in this case radial, the focus is finished by adjusting in a second (axial) dimension, where the spot size is adjusted in the conventional manner of averaging between the two optimal focal planes. When the measurements and or adjustments in the first and second dimensions are combined, a spot on a medium is improved in shape, quality, and precision by the essentially independent adjustment in each dimension of focus obtained through the resolution of related focus equations or functions thereof, solving for either of or each of the dimensions of focus, or a combination thereof.

Figure 1:
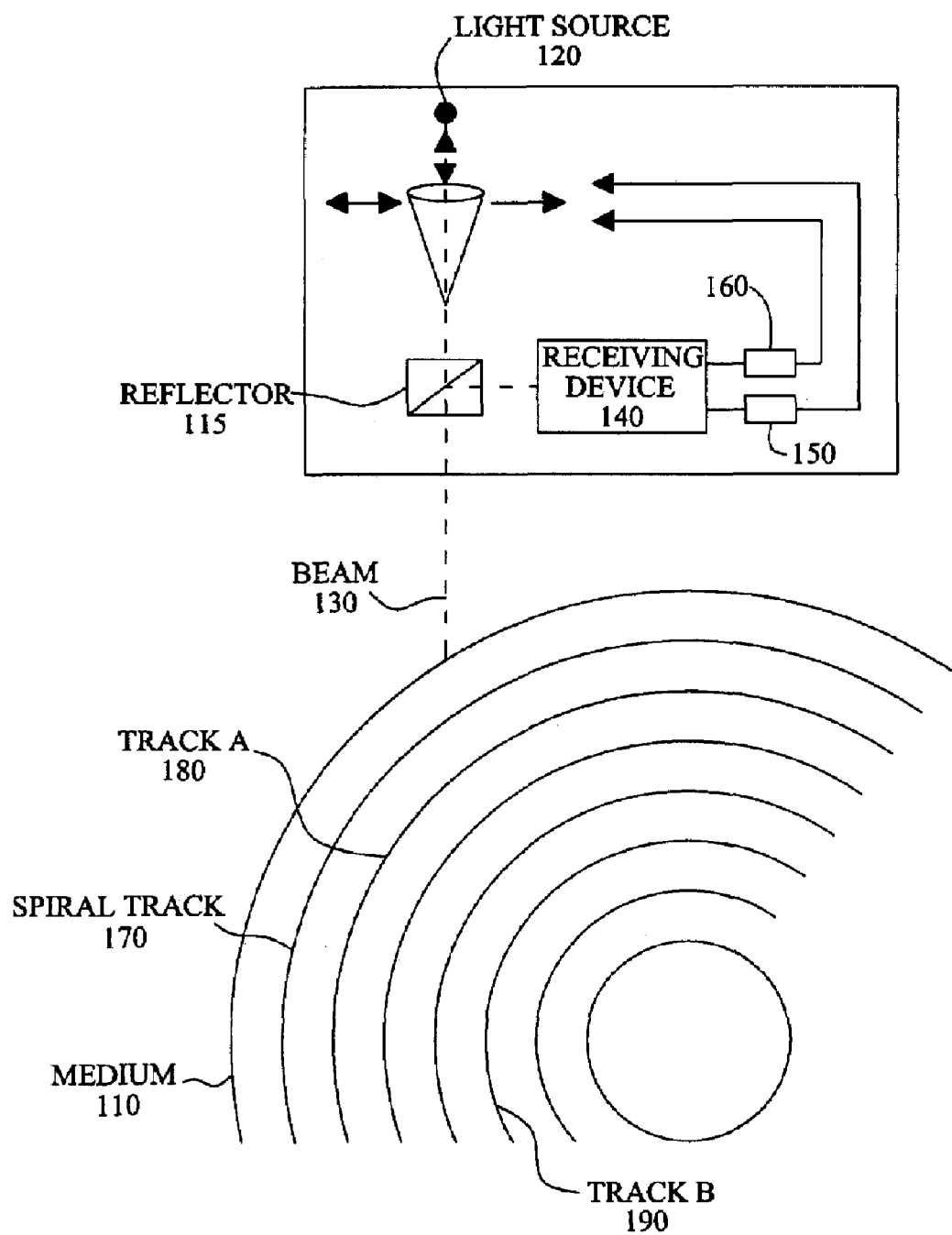
FIG. 1 is a current optical disc player and/or recorder.
Figure 2:
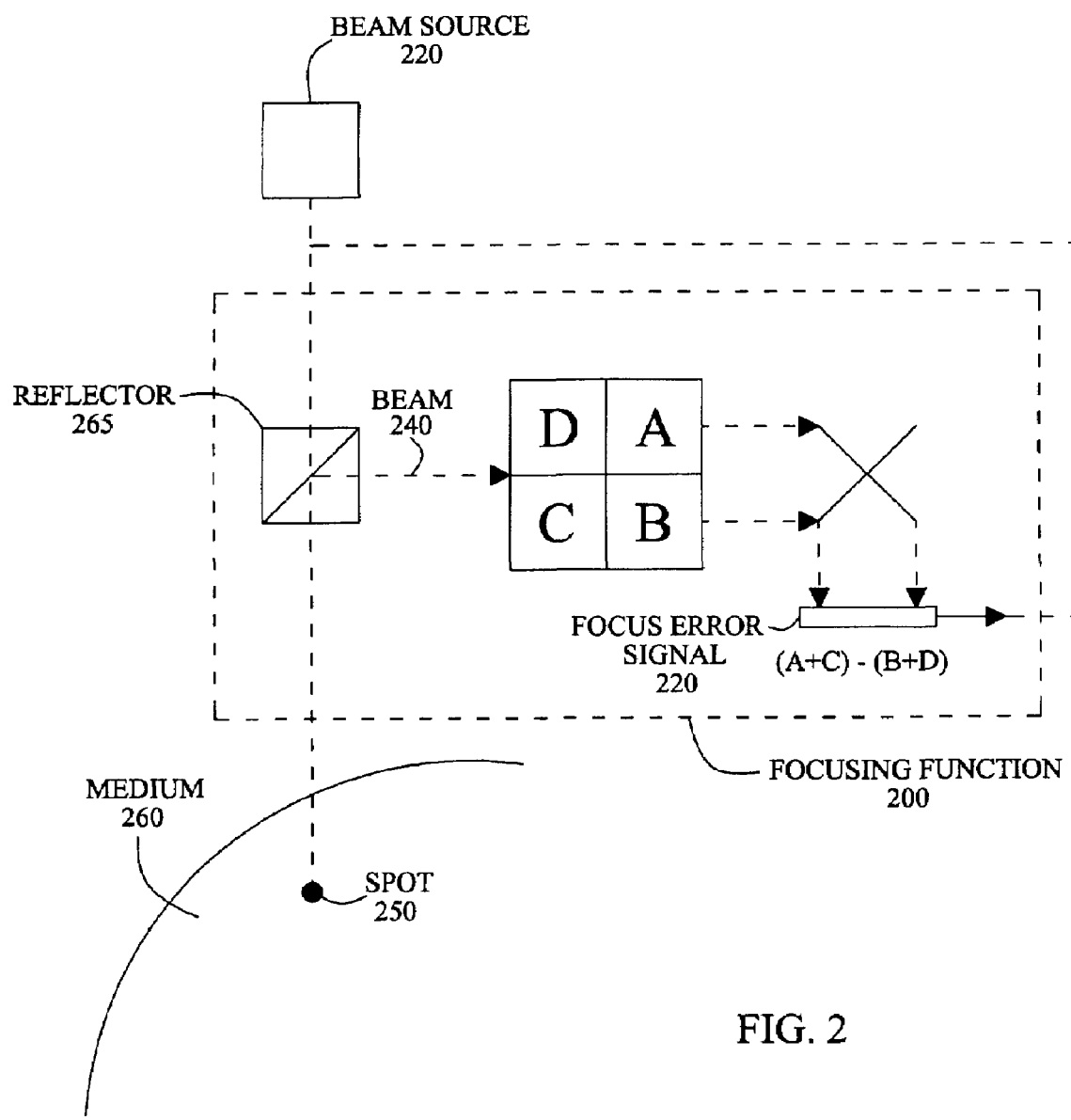
FIG. 2 is a current optical focusing system.

Currently focus is detected by photocells A through D in a conventional three beam tracking configuration where photocells A+C are compared to photocells B+D to obtain the Focus Error signal (FE) as shown in FIG. 2. In the present invention, certain photocell(s), such as photocells E and F (normally used for tracking) are compared to certain photocell(s), such as photocells A and B and C and D, in order to derive the Radial Focus Error now to be known as "RFE" by observing radial spot size.

Figure 3:
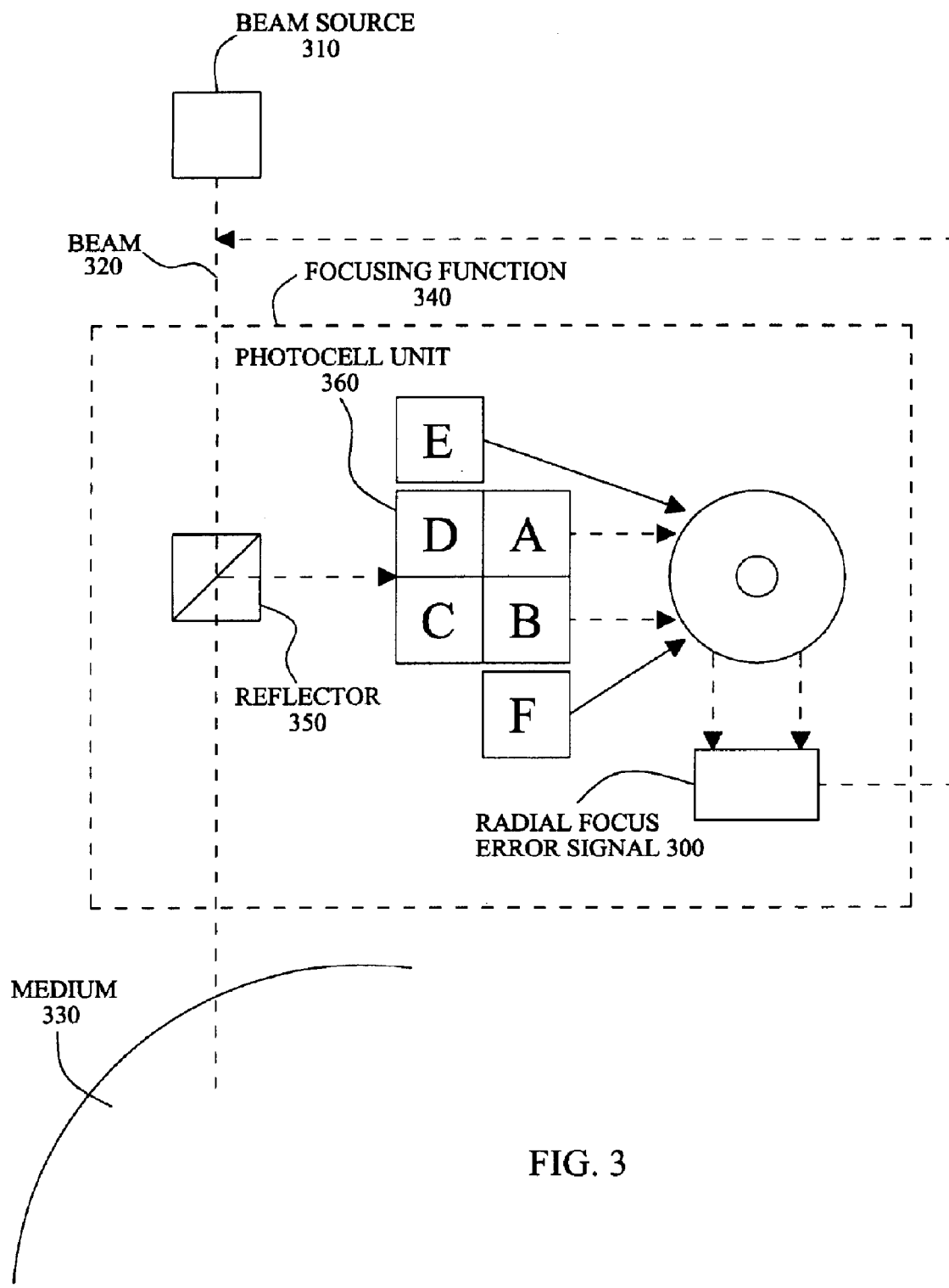
FIG. 3 is a system that derives a radial focus error signal according to an embodiment of the invention.

FIG. 3 shows an embodiment of an arrangement that is used to derive an RFE signal. A beam source 310 is used to send a beam 320 to a medium 330 and back to a focusing function 340. Beam 320 enters focusing function 340 and is diverted by a reflector 350 to a photodetector unit 360. Photocells E and F of photocell unit 360 (normally used for tracking) are compared to photocells A, B, C, and D of photocell unit 360 to derive the Radial Focus Error signal 300 (RFE).

The manner in which E and F are compared to photocells A, B, C, and D may vary depending on the embodiment of the present invention. One solution is via an algorithm using the logical AND operation. In such a case (E AND F) are compared to (A AND B AND C AND D). The comparison operation may also vary depending on the embodiment, but one example uses the division operation to finally produce the formula [RFE=(E AND F) DIV (A AND B AND C AND D)], another embodiment of the RFE is expressed as [RFE= (E+F)/(A+B+C+D)].

Figure 4:
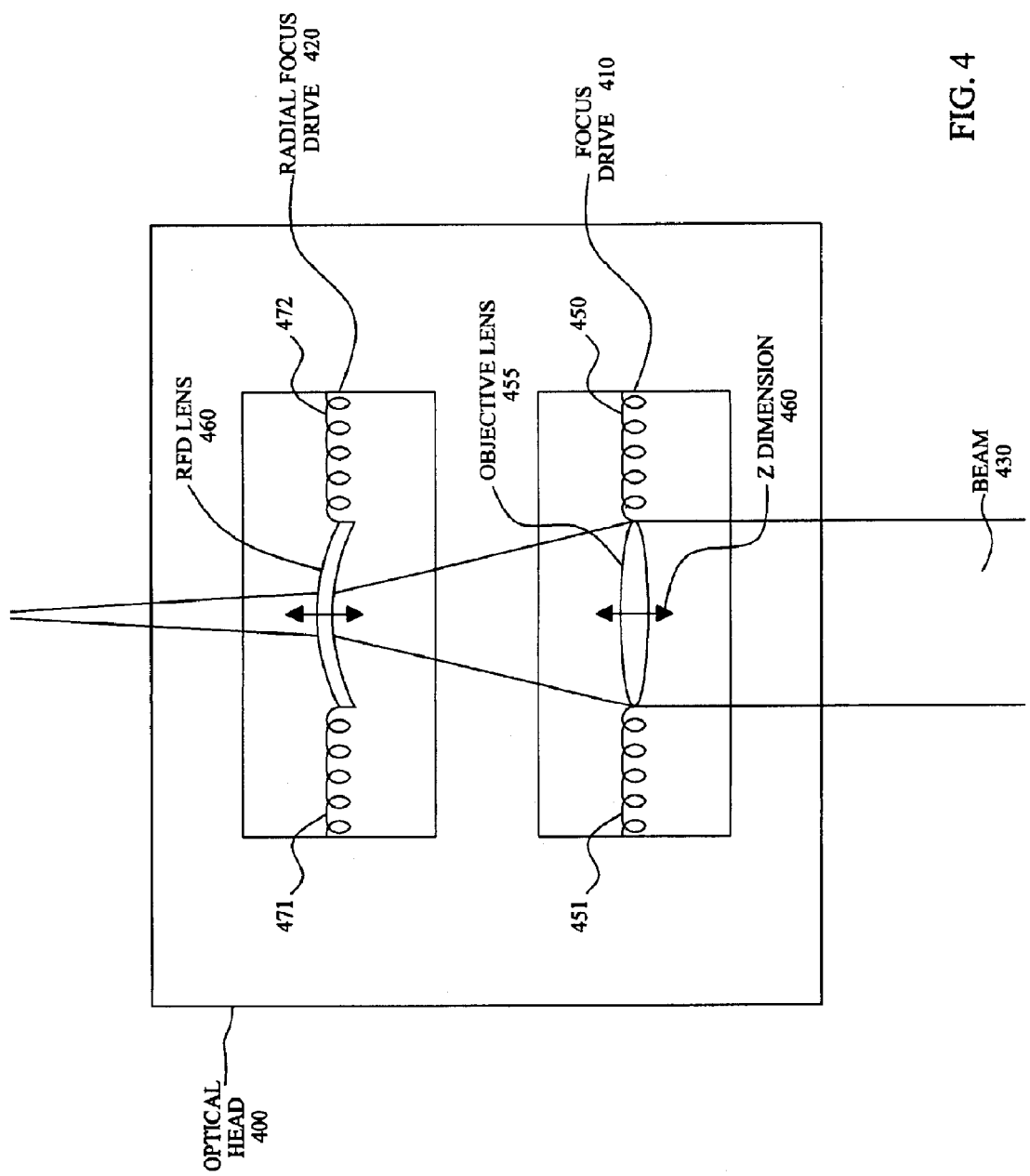
FIG. 4 shows an optical head with a radial focus drive according to an embodiment of the present invention.

An embodiment of the present invention that uses the RFE signal is shown in FIG. 4. An optical head 400 has a focus drive (FD) 410 and a radial focus drive (RFD) 420. The RFD 420 has an RFD lens 425 that is more cylindrical in shape (or equivalent) so that the focus of beam 430 from a light source is modified primarily in the radial dimension, leaving the axial dimension of beam focus less significantly modified as the beam 430 passes through. There may be additional lenses before or after the RFD lens 425 to accommodate convenient placement, beam shaping and other purposes to which the two dimensional focus may be put.

In operation of this embodiment, focus is adjusted by focus drive (FD) actuators 450 and 451, which move an objective lens 455 in the "Z" dimension 460. The additional actuator driven lens (RFD lens) 425 is added, wherein the beam path proceeds from the objective lens 455 and passes through the RFD lens 425. The RFD lens is adjusted by actuators 471 and 472 in the "Z" dimension as well.

Thus, the focusing operation of this embodiment of the present invention involves a two-step process wherein an additional stage includes an adjustment of RFD lens 425 to modify the beam mostly in the radial dimension. In one embodiment, "FE" is in a feedback loop with "FD" to resolve main focus, while "RFE" is in a feedback loop with "RFD" to resolve radial focus. This requires the use of a monitor circuit that compares the polarity of "RFE" and "RFD" to make sure that radial focus has not gone too far in the wrong direction by introducing a correcting signal to place radial focus once again within the domain where "RFE" and "RFD" are in phase.

Figure 5:
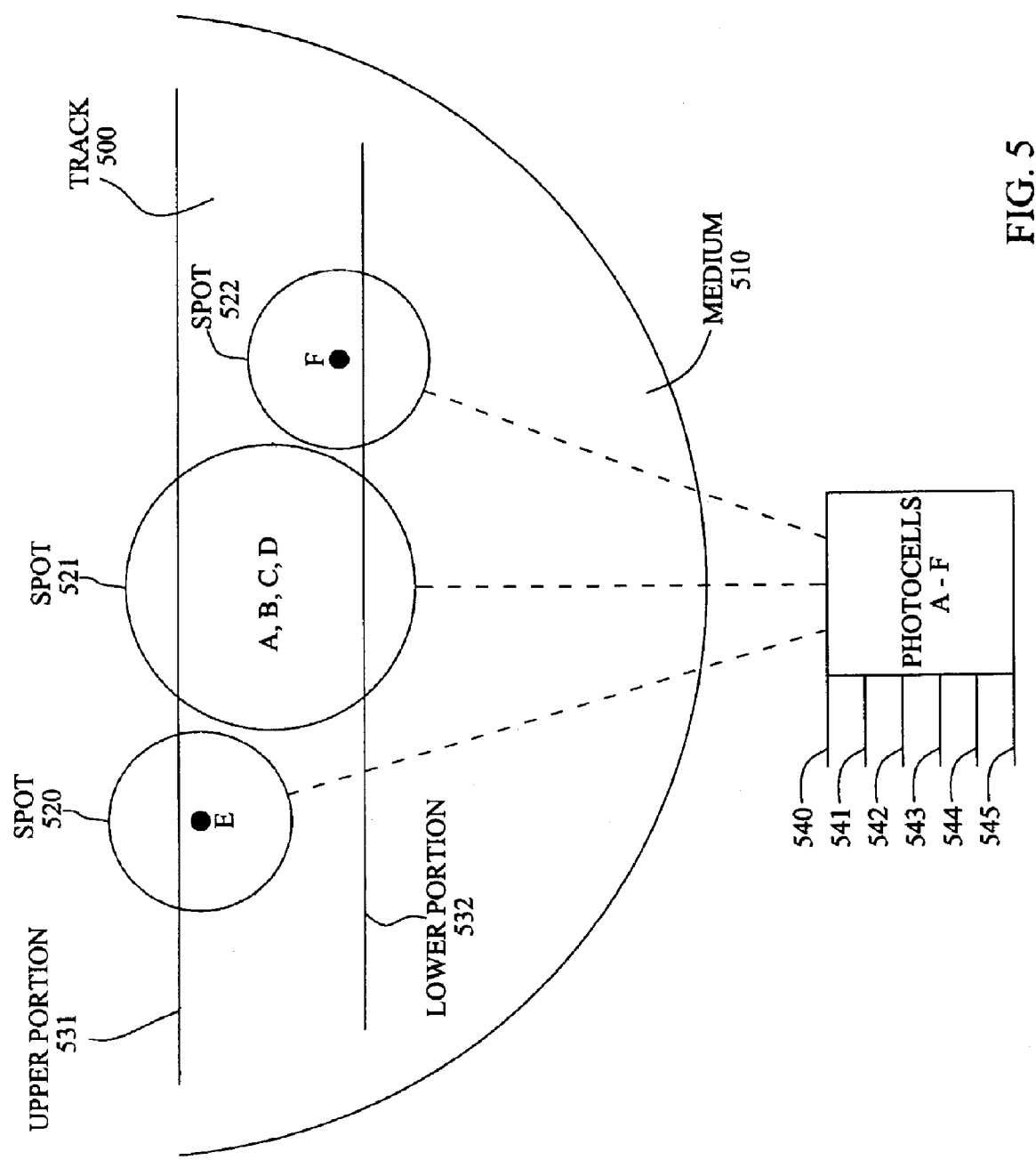
FIG. 5 shows an example of how an optical device can become out of focus and the nature of such spots that would be produced.

A feedback loop is used wherein the reflectivity of certain photocell(s), such as E and F is considered in conjunction with the reflectivity of certain photocell(s), such as A, B, C, and D in order to detect and adjust the radial spot size. FIG. 5 shows a pictorial representation of a track 500 on a medium 510 such as a common CD or DVD. Circular spots 520, 521, and 522 represent the spots produced on medium 510 by a conventional three-beam tracking system. Such a tracking system is used advantageously by the present invention to perform focus as well, since spots 520 and 522, used previously for tracking only are used by this embodiment of the present invention for focusing too.

Spot 521 represents the spot that will be reflected back to photocells A, B, C, and D. Spots 520 and 522 represent spots that will be reflected back to photocells E and F respectively. The nature of spots 520-522 determines the nature of the readings in the respective photocells A-F. The more a spot is above upper portion 531 of track 500 or below lower portion 532 of track 500, the weaker the reading will be in its respective photocell, since less light will be properly reflected back and received by the photocell.

Hence, the output voltages 540-545 of photocells A-F change depending on the nature of the spot. As such, there is an inherent relationship between output voltages 544 and 545 from the E and F detectors and output voltages 540-543 from the A, B, C, and D detectors. In this embodiment of the present invention, either the full photocell outputs or processed photocells may be used wherever the output of such photocells is mentioned. Such photocell output processing may include differentiation and/or peak (or peak to peak) detection.

Figure 6:
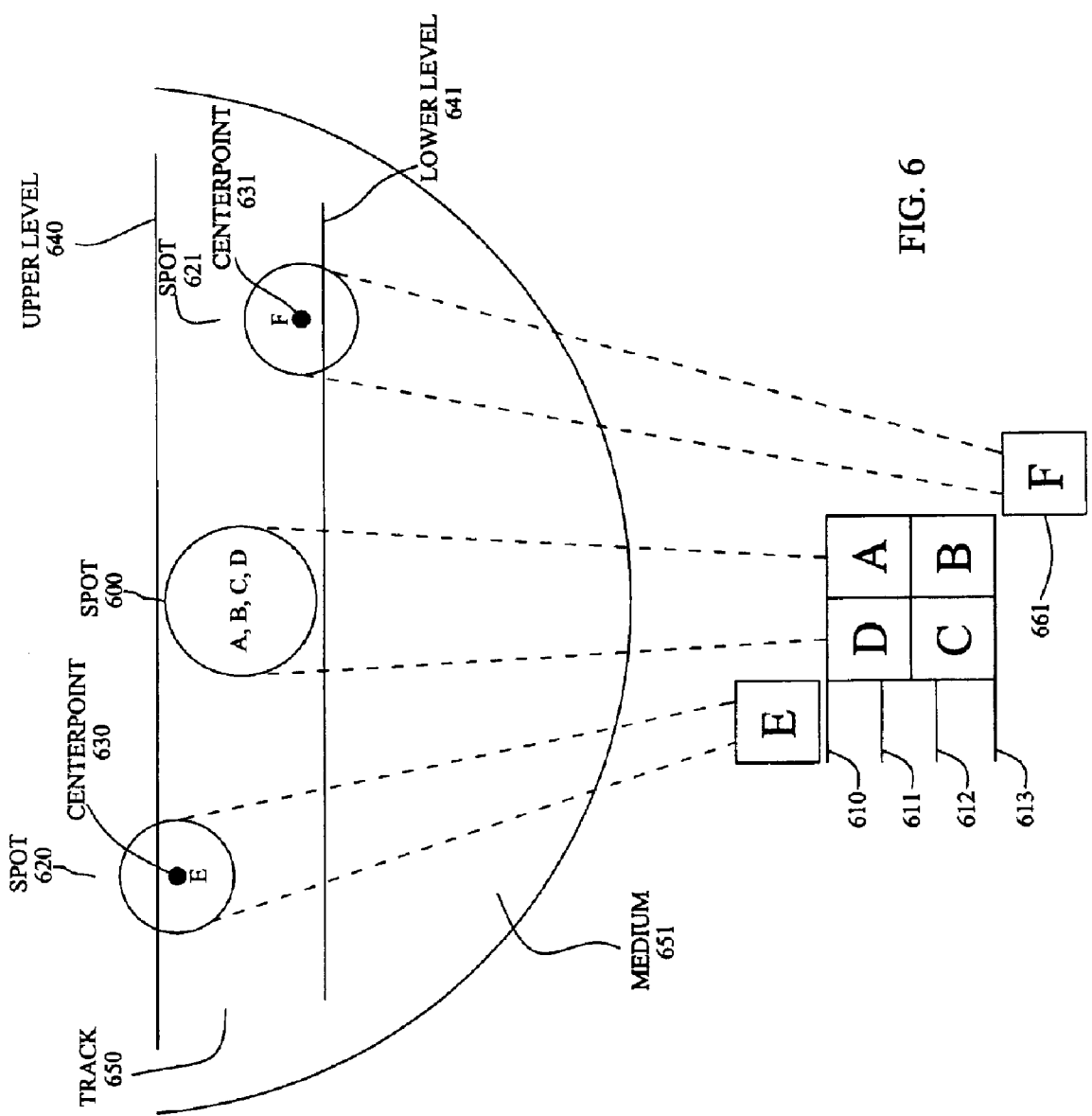
FIG. 6 shows one example of an ideal focusing scenario.

FIG. 6 shows an example of one possible ideal, adjusted focus scenario. When spot 600 is ideal it will completely reflect back to photocells A-D and the voltages 610-613 will be at an upper level reflecting a maximum luminescence. Similarly, in the ideal scenario spots 620 and 621, reflecting back to E and F will have a definite value (voltage) on lines 614 and 615 that can be adjusted based on centerpoints 630 and 631. If centerpoints 630 and 631 lie exactly on upper level 640 and lower level 641 of track 650, then in an ideal scenario the output voltages 660 and 661 from the E and F photocells is exactly halfway between a maximum value and a minimum value.

Similarly, if they are slightly offset (as shown), slightly more than half of the luminescence should reflect back to E and F. Thus, the predetermined luminescence from the ideal relationship between A-D and E and F is used to create a RFE signal. The feedback loop continually makes its adjustment based on examining the amplitude of these detectors. In one embodiment, there is a "focus wobble", a slight modulating, repeating wave (sine for instance) impressed upon the radial focus loop that is recovered through a (optimally high Q bandpass) filter and compared for phase, in order to determine that the radial focus loop is not out of phase. The two loops can be resolved at differing bandwidth. The two loops can be resolved with each loop alternately taking a turn at predominance.

Figure 7:
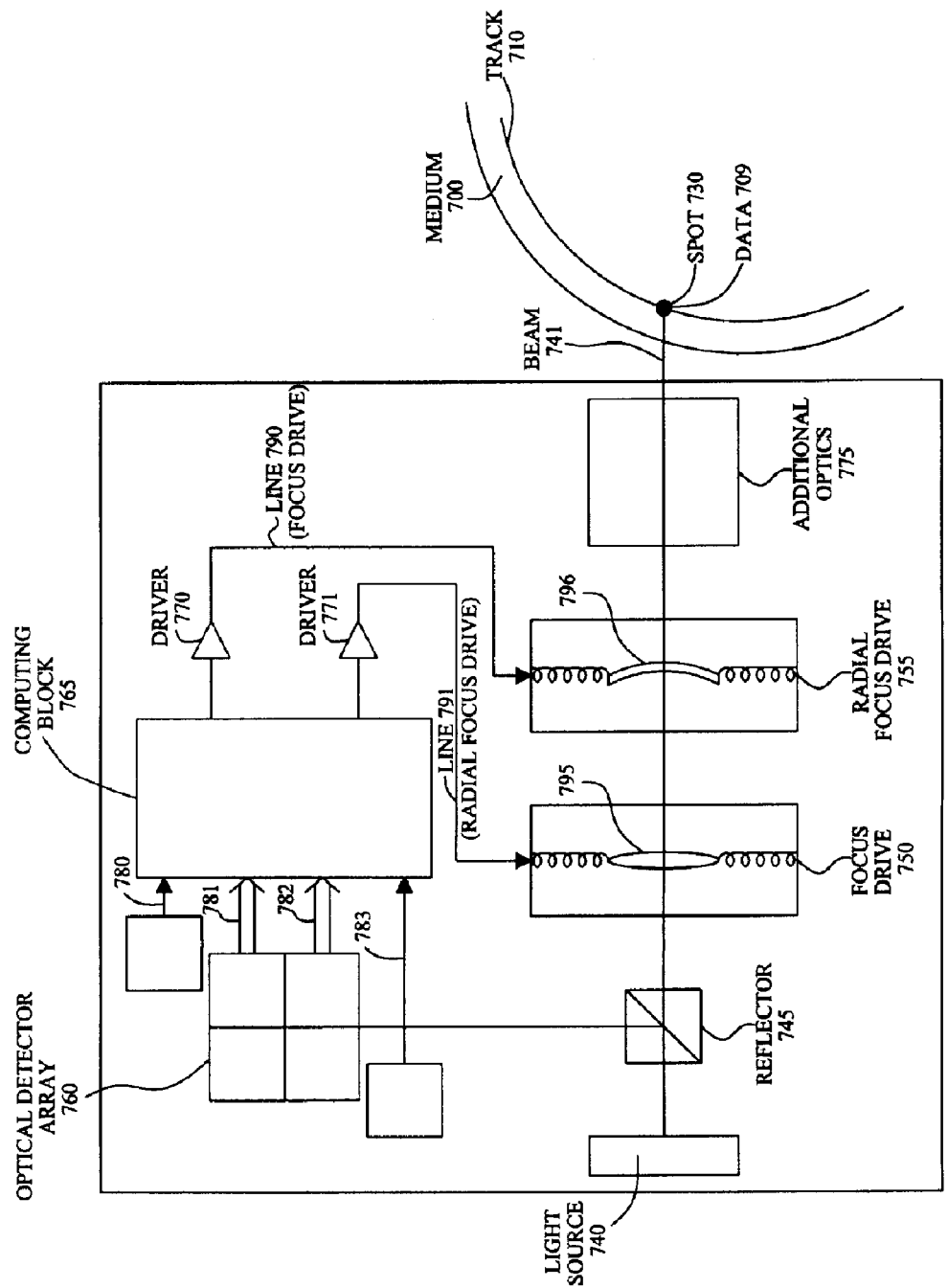
FIG. 7 is a block diagram of a focus servo system according to one embodiment of the invention.

FIG. 7 is a block diagram of a focus servo system according to an embodiment of the present invention. Medium 700 has a track 710 upon which focusing system 720 attempts to produce an ideal, focused spot 730 so that any data 709 on track 710 can be obtained and used, for listening to a song or watching a movie, for example. Focusing system 720 includes at least a light source 740 creating a beam 741, a reflector 745, a focus drive 750, a radial focus drive 755, an optical detector array 760, a computing block 765, a first and a second driver 770 and 771, and any additional, optional optics 775 for beam shaping an placement, for instance. It should be noted that focus drive 750 and radial focus drive 755 may alternatively be combined into a single optical element, such as an element containing sub-elements, or a single optical element such as an electro-convulsive (or electrically deformable) lens or reflector.

In this embodiment's operation, light source 740 sends beam 741 through reflector 745 and then to the surface of medium 700 by passing through optical elements 750, 755, and optionally 775. Beam 741 is returned via the same path but caused by reflector 745 to be diverted at an essentially 90 degree angle to reach detector array 760, which includes for instance, detectors A, B, C, D, E, and F. The voltages are output by detector array 760 reflecting the amount of light received by array 760 which has a relationship to the beam's focus (convergence upon medium 700) and tracking (the placement of the beam 741). The output voltages of detector array 760 are shown by lines 780-783. Lines 780-783 operate in conjunction with computing block 760, which may be, for instance an analog or digital computer, having associated software and/or hardware to implement mathematical and or logical operations to represent the needed functions to maintain focus and tracking in such a system.

The processed output of the signals input to block 765 is represented by lines 790 and 791 which are coupled to drivers 770 and 771 respectively. Line 790 is associated with focus drive element 750 and line 791 is associated with radial focus drive element 755. The signals along lines 790 and 791 are used to move first and second optical elements 795 and 796 respectively, using actuators associated with those elements. Thus, as a beam 741 continues to pass through the adjusted optical elements 795 and 796 the reflection of the beam from medium 700 changes, which in turn changes the readings at detector array 760, which in turn modifies the output signals along lines 795 and 796 as conditioned by computing block 760. These signals on lines 790 and 791 reach optical elements 795 and 796 and they are adjusted again. This process repeats over time and thus a feedback loop is maintained.

In a certain embodiment, "FE" and "RFE" are both passed through an analog computer circuit at block 760 that resolves a combined solution, which outputs momentary values for both "FD" and "RFD" actuators. "FE" and "RFE" might also both be converted to digital values and passed through a digital algorithm or lookup table that resolves a combined solution, which outputs momentary values for both "FD" and "RFD" coils. Thus, there are various manners in which one skilled in the art can implement computing block 760. Such analog or digital computations (or lookups) may also be directed by other parameters, including but not limited to: the overall beam power (for instance, as recognized by $(((A+B+C+D)*X)+((E+F)*Y)))$, tracking, and the momentary values voltage and/or current present on any or all of the detectors and driven devices, including lasers and actuators.

In another embodiment, computing block 760 includes a combined analog or digital computation (or lookup) that takes in the momentary values on photocells, such as A through F, and performs analog or digital calculations (or their equivalent) that include filters and/or polynomial expressions, whose result is obtained by observing the radial beam focus as associated with radial beam width (through comparing photocell(s), such as E&F to photocell(s) such as A&B&C&D) and observing the main (combined) beam focus as associated with diagonal beam aspect ratio (through comparing photocell(s), such as A&C to photocell(s), such as B&D).

The radial focus lens, whose task is to create a difference in focus between one dimension and another, may be any optical element that focuses more in one dimension than another, including an astigmatic reflector or lens or any two dimensional curve extended in a third dimension. Other optical detectors may be added to take the place of or augment the use of detectors E & F for comparing to detectors A, B, C & D, or to take the place of A, B, C & D for comparing to E & F or other detectors. The beam, alternatively may be split off to impinge upon radial focus detectors whose output is compared to each other or other detectors in order to derive a value for radial focus. Dedicated radial focus detectors may be oriented coaxially (or the equivalent in at least one dimension), such that the beam shall significantly fill the inner detector and only to a less extent fill the outer detector during a significant portion of the focus range. Additional concentric (or equivalent in at least one dimension) radial focus detectors could be used, such that the innermost ones provide fine radial focus error, and the larger outer ones provide gross focus error, for purposes of acquiring focus, as well as maintaining or reacquiring focus during disturbances.

Although the description above contains many specificities, these should not be construed as limiting the scope of the invention but as merely providing illustrations of some of the presently preferred embodiments of this invention.

Thus the scope of this invention should be determined by the appended claims and their legal equivalents.

What is claimed is:

1. A system comprising:
   a light source;
   a first focusing element capable of adjusting a focus for said light source in a first and a second dimension;
   a second focusing element capable of adjusting a focus for said light source essentially in only said first or said second dimension;
   a plurality of photodetectors for receiving said adjusted light source upon reflection from a medium; and
   a computing unit for receiving data from said photodetectors and for applying an algorithm to said data, said computing unit outputting first and second signals to said first and second focusing elements said first and second signals capable of being used to adjust said first and second optical elements.

2. The focus system of claim 1, wherein:
   said algorithm is derived through at least observations related to an aspect ratio and a spot size, wherein said aspect ratio is related to at least said first dimension of focus, and where said spot size crossing at least one boundary upon said medium is related more to at least said second dimension of focus than to said first dimension of focus.

3. The focus system of claim 2, wherein said setting or keeping a focus and said adjusting a focus are in response to said observations or said algorithm.

4. The system of claim 3 wherein said plurality of photodetectors include an A, a B, a C a D, an E, and an F photodetector.

5. The system of claim 3 wherein said algorithm comprises (A AND B AND C AND D) DIV (E and F).

6. The system of claim 3 wherein said algorithm comprises (A+B+C+D)/(E+F).

7. The system of claim 3 wherein said computing unit comprises a digital computer.

8. The system of claim 3 wherein said computing unit comprises an analog computer.

9. The system of claim 3 wherein at least one optical element within said focusing subsystem comprises an essentially concave shape.

10. The system of claim 3 wherein at least one optical element within said focusing subsystem comprises essentially a two dimensional curve extended in a third dimension.

11. The system of claim 3 wherein at least one optical element within said focusing subsystem has at least a first actuator and a second actuator, and wherein said second actuator accomplishes a similar focusing operation as is accomplished by said first actuator.

12. The system of claim 11 wherein said second actuator has a greater reaction speed or range than that of said first actuator.

13. The system of claim 3 wherein said focusing subsystem comprises a first focusing element and second focusing element.

14. A focus method comprising:
   receiving signals from a plurality of photodetectors that observe light reflected from a medium;
   making observations related to an aspect ratio and a spot size, where said aspect ratio is related to at least a first dimension of focus and where said spot size crossing at least one boundary upon said medium is related more to at least a second dimension of focus than said first dimension of focus; and
   establishing a result of said observations from which could be determined a focus in said first dimension of focus or in said second dimension of focus or in both said dimensions of focus.

15. The focus method of claim 14, further comprising the step of:
   based upon said result of said observations, setting or keeping a focus of said light source in at least said first dimension and adjusting a focus for said light source more in at least said second dimension than in said first dimension using an algorithm.

16. The method of claim 15 wherein said plurality of photodetectors include an A, a B, a C, a D, an E, and an F photodetector.

17. The method of claim 15 wherein said algorithm essentially comprises (A AND B AND C AND D) DIV (E and F).

18. The method of claim 15 wherein said algorithm essentially comprises (A+B+C+D)/(E+F).

19. The method of claim 15 wherein said observations are accomplished by computing unit essentially comprising a digital computer.

20. The method of claim 15 wherein said observations are accomplished by computing unit essentially comprising an analog computer.

21. The method of claim 15 wherein said focus operations are accomplished by a focusing system comprising at least one optical element having an essentially concave shape.

22. The method of claim 15 wherein said focus operations are accomplished by a focusing system comprising at least one optical element having a shape essentially comprising a two dimensional curve extended in a third dimension.

23. The method of claim 15 wherein said focus operations are accomplished by a focusing system comprising at least a first actuator and a second actuator, and wherein said second actuator can accomplish a similar focusing operation as can be accomplished by said first actuator.

24. The method of claim 15 wherein said focus operations are accomplished by a focusing system comprising at least a first actuator and a second actuator, and wherein said second actuator can accomplishes a similar focusing operation as can be accomplished by said first actuator, and wherein said second actuator has a greater reaction speed or range than that of said first actuator.

25. The method of claim 15 wherein said focus operations are accomplished by a focusing system comprising at least a first actuator and a second actuator, and wherein said second actuator can accomplishes a similar focusing operation as can be accomplished by said first actuator, and wherein said second actuator has a greater reaction speed or range than that of said first actuator, and wherein said step of adjusting a focus for said light source primarily in a second dimension is accomplished by stimulating said first actuator and then stimulating said second actuator.

* * * * *